United States Patent
McGinn et al.

Patent Number: 5,457,424
Date of Patent: Oct. 10, 1995

[54] QUADRATURE DEMODULATOR OPERABLE OVER DIFFERENT IF FREQUENCIES

[75] Inventors: Michael McGinn, Tempe; W. Eric Main, Mesa, both of Ariz.

[73] Assignee: Motorola, Inc., Schaumburg, Ill.

[21] Appl. No.: 318,940

[22] Filed: Oct. 6, 1994

[51] Int. Cl.[6] .................................................. H04L 27/38
[52] U.S. Cl. ............................................ 329/306; 375/324
[58] Field of Search ................................. 329/304, 305, 329/306, 307, 308, 309, 310; 375/324, 325, 326, 327

[56] References Cited

U.S. PATENT DOCUMENTS 5,260,671  11/1993  Iso et al. ................................ 329/308

Primary Examiner—Siegfried H. Grimm
Attorney, Agent, or Firm—Robert D. Atkins

[57] ABSTRACT

A demodulation circuit (10) performs quadrature demodulation on an IF input signal. The IF input signal processes through a preamplifier (12) to one input of a mixer (14). The mixer output goes to first and second multipliers (20, 22). A VCO (24) generates an oscillator signal that processes through a first multiplier (26) and first and second dividers (28, 30) to generate in-phase and quadrature recovered carrier signals that are applied to second inputs of the first and second multipliers which in turn produce the in-phase and quadrature demodulated baseband signals. A switching arrangement (32, 38, 40) for the multiplier and dividers provides the proper frequency signal to a second input of the mixer to generate sum and difference frequencies. A filter and amplifier at the output of the mixer removes the summation frequency leaving the difference frequency to the first and second multipliers.

15 Claims, 1 Drawing Sheet

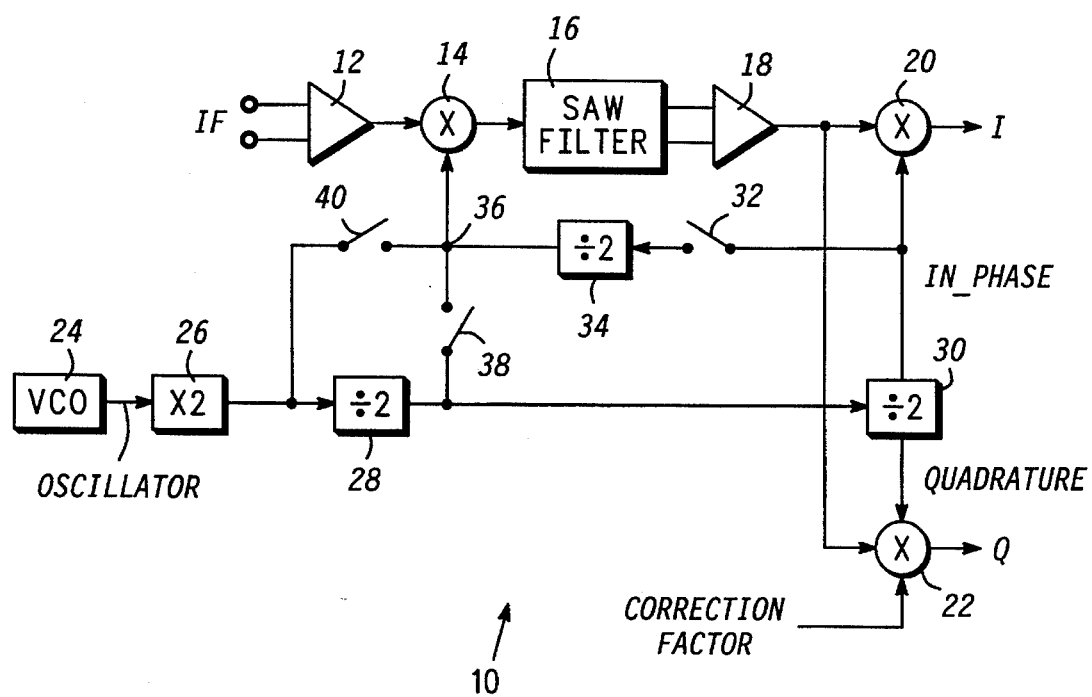

QUADRATURE DEMODULATOR OPERABLE OVER DIFFERENT IF FREQUENCIES

BACKGROUND OF THE INVENTION

The present invention relates in general to demodulation circuits and, more particularly, to a demodulation circuit that operates over a wide range of modulation frequencies.

Modern communication systems generally use modulation techniques to transmit signals over a medium such as airways or communication lines. Typical applications include cordless and cellular telephones, pagers, and other radio equipment. For example, a data communication signal is amplitude and phase modulated for transmission to a receiving site. The received data communication signal must be demodulated for end use. A variety of modulation techniques are known in the art including quadrature phase shift keying and quadrature amplitude modulation. Both of these modulation schemes combine the well known amplitude modulation and phase or frequency modulation as is used in FM radio. The quadrature modulation schemes have been widely adopted for their efficiency in transmitting information over the communication link.

On the receiving side it is necessary to demodulate the modulated communication signals. The demodulation process typically involves generating an in-phase replica of the modulated suppressed carrier and a quadrature replica of the suppressed carrier that is 90 degrees out of phase with respect to the in-phase carrier signal. In the prior art, the received modulated signal is multiplied by the in-phase and quadrature components of the recovered carrier signal to recover the baseband data communication signal. The incoming modulated signal is typically mixed down from a carrier frequency in the gigahertz (GHz) range down to an intermediate frequency of say 450 megahertz (MHz). The IF signal is filtered by a surface acoustic wave filter and amplified by an IF amplifier. The resulting IF signal is then multiplied by the in-phase and quadrature components of the recovered carrier to provide in-phase (I) and quadrature (Q) baseband signals.

A common technique of generating the in-phase and quadrature recovered carrier signals is to generate a frequency at four times the IF frequency, for example with a phase lock loop, and then divide down that frequency in two steps of division by two each step to provide the in-phase and quadrature components. It can be difficult to generate a stable low phase noise oscillator operating at four times the IF carrier frequency because the inductor and capacitor associated with such an oscillator become impractical at very high frequencies.

Another problem with the prior art demodulation is the inflexibility in operating at different IF carrier frequencies. Depending on the country of use the standard IF carrier may range from 40 MHz to 450 MHz. The oscillator and demodulation circuit is designed to a particular IF frequency of operation. For those systems needing to operate at more than one IF carrier frequency separate oscillators are needed each tuned to the predetermined carrier frequency of operation.

Hence, a need exists for a demodulation circuit that oscillates with a lower frequency oscillator while providing flexibility and operating with a variety of IF carrier frequencies.

BRIEF DESCRIPTION OF THE DRAWING

The sole figure is a block diagram illustrating a frequency demodulation circuit.

DETAILED DESCRIPTION OF THE PREFERRED EMBODIMENT

Referring to the sole figure, a demodulation circuit 10 is shown suitable for manufacturing as an integrated circuit (IC) using conventional IC processes. It is assumed that a received modulated RF signal, for example from a cordless telephone, has already been mixed down to an intermediate frequency (IF). The IF input signal is applied to preamplifier 12 having an output coupled to a first input of mixing circuit 14. Mixer 14 generates sum and difference frequencies of the applied input signals. The output signal from mixing circuit 14 is processed through a surface acoustic wave (SAW) filter 16 and then amplified by IF amplifier 18. The suppressed carrier signal at the output amplifier 18 is applied to a first input of multiplier 20 and to a first input of multiplier 22.

Demodulation circuit 10 further includes a voltage controlled oscillator (VCO) 24 that provides an OSCILLATOR signal. The output signal of VCO 24 is frequency multiplied by two in multiplier 26 and frequency divided by two in divider 28. Divider 28 produces one-to-one mark-to-space ratio of the input signal to divider 28. The signal from divider 28 is further frequency divided by two in divider 30 to provide the IN-PHASE and QUADRATURE signals to the second inputs of multipliers 20 and 22, respectively. VCO 24 is controlled so that the IN-PHASE signal is phase locked with the in-phase component of the suppressed carrier at the output of amplifier 18. The QUADRATURE signal is 90 degrees out of phase with respect to the $IN_{13}PHASE$ signal. Hence, the QUADRATURE signal is phase locked to the quadrature component of the suppressed carrier at the output of amplifier 18. The IN-PHASE and QUADRATURE signals both operate at one-half the OSCILLATOR signal frequency. Divider 30 may be implemented as serially interconnected RS latches that are clocked off opposite edges of a system clock to produce the in-phase and quadrature components, as is well known. The output signals of multipliers 20 and 22 are the in-phase (I) and quadrature (Q) baseband communication signals.

The IN-PHASE signal from divider 30 is further processed through switching circuit 32 to frequency divider 34. In an alternate embodiment, the QUADRATURE signal may be processed through switching circuit 32 to frequency divider 34. Furthermore, switching circuit 32 may be placed between the output of divider 34 and node 36. Dividers 28 and 34 may be implemented with conventional emitter coupled differential amplifying transistors having cross coupled collectors to operate as RS latches, as is well known. The output from divider 34 is coupled to a second input of mixing circuit 14 at node 36. The output of divider 28 is coupled to node 36 by way of switching circuit 38. Similarly, the output of multiplier 26 is coupled to node 36 by way of switching circuit 40. Switching circuits 32, 38 and 40 may be implemented with unity gain differential amplifiers where the switch is opened by disabling the current source to the common emitters and the switch is closed by enabling the current source to the common emitters of the differential transistors.

The operation of demodulation circuit 10 proceeds as follows. Switching circuits 32, 38 and 40 are configured according to the desired operating frequency range of the IF input signal. One of three frequency ranges of operation may be selected. The first frequency range of operation for the IF input signal is from 30 to 70 MHz in which case switching circuit 32 is closed while switching circuits 38 and 40 are opened by external control signals.

Assume for example that the IF input signal is operating at 45 MHz. Preamplifier 12 provides some amplitude amplification to overcome inherent losses of mixing circuit 14 and SAW filter 16. VCO 24 is set by a control voltage to operate at 60 MHz. The output frequency of multiplier 26 is thus 120 MHz while the output frequency of divider 28 is again 60 MHz. Divider 30 produces the IN-PHASE signal operating at 30 MHz and the QUADRATURE signal also operating at 30 MHz although 90 degrees out of phase with respect to the in-phase component of the suppressed carrier signal at the output of amplifier 18. The IN-PHASE signal is frequency divided by divider 34 and provides a 15 MHz signal to the second input of mixing circuit 14. Mixing circuit 14 generated sum and difference frequency signals of 30 and 60 MHz. SAW filter 16 is a pass-band filter that removes the 60 MHz signal leaving the 30 MHz signal which is amplified by IF amplifier 18 and applied to the first inputs of multipliers 20 and 22. Multiplier 20 generates the I baseband signal following multiplication with the IN-PHASE regenerated carrier. Multiplier 22 generates the Q baseband signal following multiplication with the QUADRATURE component of the regenerated carrier signal.

Thus, one feature of the present invention is the arrangement of the multipliers, dividing circuits, and switching circuits to the mixer that allows VCO 24 to operate at a lower frequency of 60 MHz whereas in the prior art a VCO would have to operate in the 100 MHz range for a comparable demodulation circuit.

In a second configuration of the demodulation circuit the range of frequency operations for the IF input signal is 70 to 180 MHz. Switching circuits 32 and 40 are opened while switching circuit 38 is closed by the external control signals. VCO 24 is set by the control voltage to operate at 80 MHz given an IF input frequency of 120 MHz. The output of divider 28 provides an 80 MHz signal to divider 30 that produces 40 MHz IN-PHASE and QUADRATURE components for multipliers 20 and 22. The 80 MHz signal from divider 28 mixes with the 120 MHz of IF input signal and produces sum and difference frequencies of 40 and 200 MHz. SAW filter 16 removes the 200 MHz signal leaving the 40 MHz IF signal following amplification through IF amplifier 18. Multiplier 20 multiplies the 40 MHz IF signal with the 40 MHz IN-PHASE regenerated carrier for providing the I component of the baseband signal. Multiplier 22 multiplies the 40 MHz IF signal from amplifier 18 with the QUADRATURE signal from divider 30 for providing the Q baseband component of the data communication signal. The arrangement of multipliers, dividing circuits, and switching circuits to mixing circuit 14 allows VCO 24 to operate at 80 MHz as compared to prior art arrangements which would have required a VCO operating at 480 MHz.

In a third configuration, demodulation circuit 10 is arranged for an IF input frequency range of 180 MHz to 1.0 GHz. Switching circuits 32 and 38 are open while switching circuit 40 is closed by the external control signals. With an IF signal of 480 MHz, VCO 24 is set by the control voltage to operate at 192 MHz. The output signal of multiplier 26 operates at 384 MHz to the second input of mixing circuit 14. The 480 MHz IF input signal mixes with the 384 MHz signal and produces sum and difference frequencies of 96 and 864 MHz. SAW filter 16 removes the 864 MHz signal leaving 96 MHz at the first inputs of multipliers 20 and 22. The 192 MHz signal from VCO 24 is multiplied by two and then divided by two yielding the same 192 MHz signal to divider 30. Divider 30 produces 96 MHz IN-PHASE and QUADRATURE signals to multipliers 20 and 22, respectively. Multiplier 20 combines the 96 MHz from IF amplifier 18 with the 96 MHz IN-PHASE signal from divider 30 to provide the I component of the baseband signal. Multiplier 22 multiplies the 96 MHz from amplifier 18 with the 96 MHz QUADRATURE signal from divider 30 for providing the Q component of the baseband signal. The arrangement of the switches to mixing circuit 14 allows VCO 24 to operate at 192 MHz given the 480 MHz IF input signal whereas the prior art would typically require a VCO of 1.92 GHz to accomplish a similar demodulating function.

In an alternate embodiment of the present invention, multiplier 22 may include a third multiplication input to provide a correction factor between the IN-PHASE and QUADRATURE components of the regenerated carrier signal to correct any mis-match and delay in the multiplying operation.

By now it should be appreciated that the present invention provides an arrangement of multipliers, dividers and switches to a mixing circuit. By switching in the appropriate amount of frequency multiplication and division, the VCO may operate at a low frequency relative to the incoming IF signal, or at least not several factors larger than the IF signal. The low frequency VCO is easier and less costly to build. The switching also allows a greater range of acceptable IF input frequencies.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A demodulation circuit, comprising:

a VCO providing an oscillator signal at an output;

a first divider having an input coupled for receiving said oscillator signal and having an output;

a second divider having an input coupled to said output of said first divider and having first and second outputs for generating first and second signals operating in quadrature;

a third divider having an input coupled to said first output of said second divider and having an output coupled to a first node;

a mixer having first and second inputs and an output, said first input being coupled for receiving a modulated IF input signal, said second input being coupled to said first node;

a first multiplier having first and second inputs and an output, said first input being coupled to said output of said mixer, said second input being coupled for receiving said first signal in quadrature, said output providing a first component of a demodulated baseband signal; and a second multiplier having first and second inputs and an output, said first input being coupled to said output of said mixer, said second input being coupled for receiving said second signal in quadrature, said output providing a second component of said demodulated baseband signal.

2. The demodulation circuit of claim 1 further including a first switching circuit coupled between said output of said first divider and said first node.

3. The demodulation circuit of claim 2 further including a second switching circuit coupled between said first output of said second divider and said input of said third divider.

4. The demodulation circuit of claim 3 further including a third multiplier having an input coupled to said output of said VCO and having an output coupled to said input of said first divider.

5. The demodulation circuit of claim 4 further including a third switching circuit coupled between said output of said third multiplier and said first node.

6. The demodulation circuit of claim 5 further including:
 a filter having an input coupled to said output of said mixer; and
 a first amplifier having an input coupled to an output of said filter and having an output coupled to said first input of said first and second multipliers.

7. The demodulation circuit of claim 6 further including a second amplifier having an input coupled for receiving said modulated IF input signal and having an output coupled to said first input of said mixer.

8. A demodulation circuit, comprising:
 a VCO providing an oscillator signal at an output;
 a first multiplier having an input coupled to said output of said VCO;
 a first divider having an input coupled to an output of said first multiplier;
 a first switching circuit coupled between said output of said first divider and a first node;
 a second divider having an input coupled to an output of said first divider and having first and second outputs for generating first and second signals operating in quadrature;
 a mixer having first and second inputs and an output, said first input being coupled for receiving a modulated IF input signal, said second input being coupled to said first node;
 a second multiplier having first and second inputs and an output, said first input being coupled to said output of said mixer, said second input being coupled for receiving said first signal in quadrature, said output providing a first component of a demodulated baseband signal; and
 a third multiplier having first and second inputs and an output, said first input being coupled to said output of said mixer, said second input being coupled for receiving said second signal in quadrature, said output providing a second component of said demodulated baseband signal.

9. The demodulation circuit of claim 8 further including a second switching circuit coupled between said output of said first multiplier and said first node.

10. The demodulation circuit of claim 9 further including:
 a third switching circuit having one conduction terminal coupled to said first output of said second divider; and
 a third divider having an input coupled to a second conduction terminal of said third switching circuit and having an output coupled to said first node.

11. The demodulation circuit of claim 10 further including:
 a filter having an input coupled to said output of said mixer; and
 a first amplifier having an input coupled to an output of said filter and having an output coupled to said first input of said second and third multipliers.

12. The demodulation circuit of claim 11 further including a second amplifier having an input coupled for receiving said modulated IF input signal and having an output coupled to said first input of said mixer.

13. An integrated demodulation circuit, comprising:
 a VCO providing an oscillator signal at an output;
 a first multiplier having an input coupled to said output of said VCO;
 a first switching circuit coupled between an output of said first multiplier and a first node;
 a first divider having an input coupled to an output of said first multiplier;
 a second switching circuit coupled between said output of said first divider and said first node;
 a second divider having an input coupled to an output of said first divider and having first and second outputs for generating first and second signals operating in quadrature;
 a third switching circuit having one conduction terminal coupled to said first output of said second divider;
 a third divider having an input coupled to a second conduction terminal of said third switching circuit and having an output coupled to said first node;
 a mixer having first and second inputs and an output, said first input being coupled for receiving a modulated IF input signal, said second input being coupled to said first node;
 a second multiplier having first and second inputs and an output, said first input being coupled to said output of said mixer, said second input being coupled for receiving said first signal in quadrature, said output providing a first component of a demodulated baseband signal; and
 a third multiplier having first and second inputs and an output, said first input being coupled to said output of said mixer, said second input being coupled for receiving said second signal in quadrature, said output providing a second component of said demodulated baseband signal.

14. The integrated demodulation circuit of claim 13 further including:
 a filter having an input coupled to said output of said mixer; and
 a first amplifier having an input coupled to an output of said filter and having an output coupled to said first input of said second and third multipliers.

15. The integrated demodulation circuit of claim 14 further including a second amplifier having an input coupled for receiving said modulated IF input signal and having an output coupled to said first input of said mixer.

* * * * *